ies and methods of operating marine diesel engines.
2,841,126

MARINE DIESEL FUEL COMPOSITIONS AND METHODS OF OPERATING MARINE DIESEL ENGINES

Troy L. Cantrell, Drexel Hill, and Mark L. Hill, Springfield, Pa., assignors to Gulf Oil Corporation, Pittsburgh, Pa., a corporation of Pennsylvania No Drawing. Application May 9, 1955
Serial No. 507,125

4 Claims. (Cl. 123—1)

This invention relates to marine diesel fuel compositions and methods of operating marine diesel engines. More particularly, the invention relates to medium diesel fuels containing small amounts of a selected class of substantially neutral salts of primary n-alkyl amines and dialkyl acid orthophosphates.

The fuels normally used for marine diesel engines of the kind used to power certain military vessels, and also to power auxiliary equipment of other types of vessels, are among the heaviest of the distillate fuels. Such fuels are desirable for marine use because of their lower cost and higher heat content. However, because of their viscosity, these fuels are unusually susceptible to emulsification problems; that is, water contacted by the marine diesel fuel tends to be entrained therein in the form of relatively stable emulsions. To further complicate the matter, the marine diesel fuel is often admixed with sea water in the tanks of a vessel at sea. This is done in order to maintain the stability of the vessel. Thus, it happens that a distillate fuel having substantial susceptibility to emulsification is often contacted prior to usage in a marine diesel engine with large volumes of salt, with the inevitable result that appreciable quantities of corrosive salt water become emulsified in the fuel.

Emulsification of salt water in marine diesel fuel constitutes a serious problem in view of the damage caused by corrosion, and possibly abrasion, of diesel fuel pumps and fuel injectors by salt water. Damage to the fuel injectors is particularly serious as the proper operation of the diesel engine is dependent in large measure upon the proper functioning of the fuel injectors. Moreover, these fuel injectors are constructed of finely machined parts involving close tolerances, and as a consequence they are costly to replace. To illustrate the extent of the problem, it may be noted that tests carried out in a diesel engine with a salt water-containing fuel show that the presence of as little as 0.01 percent of salt water in the diesel fuel will cause visible damage to fuel injector parts in as little as eight hours time.

For the reasons indicated above and in order to protect the engines from the harmful action of rust particles from fuel storage tanks, it has been found desirable to incorporate into marine diesel fuels substances that are capable of imparting rust and corrosion inhibiting properties to the fuels. Because of problems peculiar to marine diesel fuels many conventional rust and corrosion inhibitors of widely varying chemical types have been found unsatisfactory. Thus, numerous corrosion inhibitors are unsatisfactory simply for the reason that they are incapable of preventing corrosion by sea water in the low concentrations which are required in diesel fuel. Metal containing corrosion inhibitors are objectionable, since they tend to form deposits. Still other conventional inhibitors have been found objectionable in that they tend to lose effectiveness on protracted storage in contact with sea water when a portion of the inhibitor is either hydrolized or leached out of the fuel by constant contact with the large volumes of water contacted therewith, volumes which can substantially exceed the volume of the diesel fuel itself. In the small concentrations in which an effective corrosion inhibitor must be present in diesel fuel, and under the severe corrosive conditions produced by sea water, the loss of even a small portion of the inhibitor into the ballast water phase will greatly reduce the effectiveness of the fuel to prevent damage to the fuel injector parts.

A particularly severe deficiency of a wide variety of otherwise satisfactory inhibitors for marine diesel fuels is that they tend to magnify greatly the propensity of the fuels to form emulsions, a tendency which is already exceptionally great in marine diesel fuel as compared with other members of the class of distillate fuels. These inhibitors tend to defeat their own purpose by promoting emulsification of larger quantities of salt water than the inhibitors can protect against. Such inhibitors are further objectionable in that the large amounts of salt incorporated in the fuel by the inhibitors promote undue engine and ring wear through abrasion.

We have found that excellent rust and corrosion inhibiting characteristics can be imparted to marine diesel fuels normally contacted with salt water, without appreciably increasing the emulsibility of the fuels, by incorporation therein of small amounts of the class of agents disclosed herein. The present invention therefore includes marine diesel fuel compositions comprising a major amount of a medium diesel fuel and containing an effective, rust inhibiting amount of about 0.001 to about 0.1 percent by weight of the composition of a substantially neutral salt of a primary n-alkyl amine containing 8 to 18 carbon atoms per molecule and a dialkyl acid orthophosphate whose alkyl groups are selected from the group consisting of 3-methylbutyl, 2-ethylhexyl, Oxo-amyl, and Oxo-octyl. The invention further includes methods of operating a diesel engine using a medium diesel fuel of the character described and containing an objectionable, corrosion producing amount of salt water.

The rust inhibitors having use in the diesel fuel compositions of this invention are prepared by reacting a suitable dialkyl acid orthophosphate with substantially equimolar proportions of one or more primary n-alkyl amines of the class indicated. The reaction is normally exothermic, and the temperature should be maintained between 140° and 200° F., and preferably below 180° F., the reaction mixture being externally cooled if necessary. The pH of the product can be adjusted to substantially neutral, by which is meant a pH of 5.5 to 7.5, preferably about 7 (as measured with a quinhydrone-calomel electrode assembly), by the use of greater or lesser than equimolar proportions of the primary n-alkyl amine. The reaction is preferably carried out in a mineral oil solvent, e. g., a lubricating oil, in order to facilitate control of the reaction and as the resulting product is in the form of a mineral oil concentrate that is relatively easily blended with the diesel fuel.

Amines that form suitable addition salts with the disclosed dialkyl phosphates are primary n-alkyl amines containing 8 to 18 carbon atoms per molecule. An example of a preferred primary n-alkyl amine that forms addition salts useful in the compositions of this invention is n-dodecyl (lauryl) amine. It is not necessary that the amine be in pure form, and other amines can be present. In fact, excellent results have been obtained with addition salts prepared from mixtures of primary n-alkyl amines of the class indicated. An example of a commercial mixture of amines that forms outstandingly effective addition salts with the herein disclosed dialkyl orthophosphates is cocoamine, which is a mixture of primary n-alkyl amines derived from coconut oil fatty acids.

Cocoamine normally has a mol combining weight of about 210, a melting point of about 21° C., and is composed principally of n-dodecyl amine together with lesser amounts of homologous, primary straight chain amines containing an even number of carbon atoms ranging from 8 to 18.

Examples of other amines within the disclosed class are n-octyl amine (caprylyl amine), n-decyl amine (capryl amine), n-tetradecyl amine (myristyl amine), and n-hexadecyl amine (palmityl amine).

An example of a dialkyl acid orthophosphate of the class disclosed and that forms especially effective addition salts with the primary n-alkyl amines indicated above is the 3-methylbutyl, 2-ethylhexyl acid orthophosphate. Examples of other dialkyl acid orthophosphates that can be used to prepare addition salts with the amines indicated above are dialkyl acid o-phosphates where the alkyl groups are derived from $C_5$ and $C_8$ Oxo alcohols, which as is known are predominantly branched chain saturated aliphatic monohydric alcohols prepared by the "Oxo" process, a process that involves the hydroformylation of olefinic hydrocarbons with hydrogen and carbon monoxide, followed by hydrogenation of the carbonylic compounds thus obtained. By way of example, the commonest $C_8$ Oxo alcohols consist mostly of isomeric dimethylhexanols, and the commonest $C_5$ Oxo alcohols consist mostly of isomeric methylbutanols. Specific examples of other dialkyl acid orthophosphates within the disclosed class are the bis-(3-methylbutyl) acid orthophosphate and the bis(2-ethylhexyl) acid orthophosphate.

A specific example of an especially effective inhibitor for the purposes of the invention is the neutral addition salt (pH 7 of cocoamine and 3-methylbutyl, 2-ethylhexyl acid orthophosphate. A specific example of an effective, essentially pure addition salt, the use of which is included by the invention, is the neutral (pH 7) addition salt of n-dodecyl amine (lauryl amine) and 3-methylbutyl, 2-ethylhexyl acid orthophosphate. Examples of other addition salts within the class disclosed are the substantially neutral addition salts (pH 5.5–7.5) of n-octyl amine, n-decyl amine, n-tetradecyl amine, and n-hexadecyl amine, and 3-methylbutyl, 2-ethylhexyl acid orthophosphate; Oxo amyl, Oxo octyl acid orthophosphate, bis-(3-methylbtuyl) acid orthophosphate, and bis-(2-ethylhexyl) acid orthophosphate.

A preferred substantially neutral salt having use in the compositions of this invention can be prepared by a typical procedure comprising introducing into a vessel, equipped with heating and cooling coils and mechanical means for agitation, and about 210 parts by weight of cocoamine (Armeen CD), purchased from Armour & Company, Chicago, Illinois, and which consisted of about 47 percent n-dodecyl amine together with substantially lesser proportions of primary n-alkyl amines homologous thereto and containing even numbers of carbon atoms from 8 to 18. To the cocoamine is slowly added about 281 parts by weight of 3-methylbutyl, 2-ethylhexyl acid orthophosphate in lubricating oil solution (purchased from the Victor Chemical Company), the temperature of the reaction being maintained below about 180° F. After addition of the dialkyl acid orthophosphate is complete, approximately 14 parts by weight of additional cocoamine is added to adjust the pH of the mixture to exactly 7, and the mixture stirred for about one hour. A typical product obtained by the above procedure is an 84 weight percent solution in mineral oil of the neutral salt of cocoamine and 3-methylbutyl, 2-ethylhexyl acid orthophosphate, that is amber-red in color. The product is readily soluble in lubricating oil and diesel fuel and practically insoluble in water.

The inhibitors that are useful for the purposes of this invention can be incorporated in marine diesel fuels of the kind disclosed herein in any suitable manner. For example, they can be added as such or in the form of concentrated mineral oil solutions, such as disclosed above. Some stirring may be desirable to produce a homogeneous mixture more rapidly, but stirring is ordinarily not essential. The inhibitors disclosed herein may also be prepared in situ, if desired.

The inhibitors disclosed herein are useful in marine diesel fuels of the class disclosed when used in concentrations of about 0.001 to about 0.1 percent by weight of the composition. Excellent results have been obtained with about 0.002 to about 0.05 percent by weight, and this constitutes a preferred range of concentrations which needs to be exceeded only in exceptional cases.

Diesel fuels suitable for marine diesel engine usage are distillate fuels which consist entirely of straight run components having performance characteristics within the medium or "2–D" diesel fuel range. Medium diesel fuels, otherwise termed "2–D" diesel fuels, are defined in ASTM D975–52T. Such oils have a viscosity range of 32 to 45 S. U. S. at 100° F., which is just outside that of the lubricating oil range. Accordingly, these oils although still distillate fuels possess substantially the emulsification characteristics of oils within the lubricating range. Medium diesel fuels may have a maximum water content of 0.1 percent.

The diesel fuels of the class described are those normally used in marine diesel engines of the kind used to power certain military vessels, e. g., submarines, and auxiliary diesel engines in other vessels.

EXAMPLE I

A marine diesel fuel according to this invention is prepared by dissolving 0.05 percent by weight of the composition of an 84 percent solution in lubricating oil of a neutral salt (pH 7.0) of cocoamine and 3-methylbutyl, 2-ethylhexyl acid orthophosphate in a commercial grade marine diesel fuel consisting of straight run components and having the following inspections:

Viscosity: S. U. S. at 100° F _____ 32–45
Distillation, ° F.:

| | |
|---|---|
| Over point | 355 |
| 10% | 456 |
| 50% | 522 |
| 90% | 586 |
| End point | 620 |

The foregoing example is illustrative only and other compositions of improved corrosion inhibiting properties and included by the invention can be obtained by substituting other addition salts disclosed herein in the foregoing example, in the same or equivalent proportions.

The ability of the salts of this invention to inhibit salt water corrosion, without adversely affecting emulsibility of the oils and the resistance of the salts to water leaching has been demonstrated by tests carried out on a medium diesel fuel having the inspections described in Example I, and consisting of 40 percent straight run 2–D diesel fuel distillate obtained from Ordovician Delta crude and 60 percent straight run medium diesel fuel distillate obtained from Southern Louisiana crude, which blended diesel fuel contained 0.03 weight percent of the neutral cocoamine addition salt of 3-methylbutyl, 2-ethylhexyl acid orthophosphate. Resistance to salt water corrosion and salt water leaching was demonstrated by subjecting the diesel fuel to an accelerated corrosion test patterned after the ASTM D665–54, procedure B, accelerated corrosion test. Briefly, the test comprised vigorously agitating the test sample with 50 percent by volume of synthetic sea water (ASTM D665–54), settling for one hour, and then evaluation of the fuel according to modified procedure B of ASTM D665–54. This modified test in turn involved immersing a polished steel test rod in an agitated mixture of 300 ml. of the test oil and 30 ml. synthetic sea water at 100° F. for a standard test period. At the end of the test the test rod is examined for rust.

The emulsification tendencies of the test oil were rated by determining the steam emulsion number of the oil. This test involves steaming the oil under the conditions prescribed in D157–51T, and determining the time in seconds for the oil and condensed steam to separate. The number of seconds required for separation is reported as the steam emulsion number.

For the sake of comparison a number of samples of the same diesel fuel as above, but containing 0.03 weight percent of standard commercial oil-soluble rust inhibitors of various chemical types, were subjected to the same tests described above. The results of all of the tests are presented in Table A below.

Table B

|  | 1 | 2 | 3 |
| --- | --- | --- | --- |
| Make-up: Percent by Vol.: |  |  |  |
| Reference Medium Diesel Fuel | 100 | 99.9 | 99.99 |
| Cocoamine Salt of 3-Methylbutyl, 2-Ethylhexyl Acid Orthophosphate |  | 0.1 | 0.01 |
| Inspections: |  |  |  |
| Four Ball Test, 1,800 R. P. M., Spindle Speed, 1.0 Kg., Lever Load, Scar Diameter:mm | 0.489 | 0.415 | 0.462 |

The foregoing results demonstrate the improved lu-

Table A

|  | 1 | 2 | 3 | 4 | 5 | 6 | 7 | 8 |
| --- | --- | --- | --- | --- | --- | --- | --- | --- |
| Make-up: Percent by Vol.: |  |  |  |  |  |  |  |  |
| Reference Medium Diesel Fuel | 100 | 99.97 | 99.97 | 99.97 | 99.97 | 99.97 | 99.97 | 99.97 |
| Cocoamine Salt of 3-Methylbutyl, 2-Ethylhexyl Acid Orthophosphate |  | 0.03 |  |  |  |  |  |  |
| Commercial Inhibitor A |  |  | 0.03 |  |  |  |  |  |
| Commercial Inhibitor B |  |  |  | 0.03 |  |  |  |  |
| Commercial Inhibitor C |  |  |  |  | 0.03 |  |  |  |
| Commercial Inhibitor D |  |  |  |  |  | 0.03 |  |  |
| Commercial Inhibitor E |  |  |  |  |  |  | 0.03 |  |
| Commercial Inhibitor F |  |  |  |  |  |  |  | 0.03 |
| Inspections: |  |  |  |  |  |  |  |  |
| Corrosion Test, ASTM D665–54, Procedure B (Mod.) | fail | pass | fail | fail | fail | fail | fail | fail |
| Emulsion Test, Steam Emulsion No.: Minutes | 8 | 10 | 38 | 65 | 25 | 826 | 38 | 22 |

In the foregoing table commercial inhibitor A was sorbitan monooleate, inhibitor B was N-"tallow"-aminopropylamine dioleate, inhibitor C was dodecenyl succinic anhydride, inhibitor D was a mixture of ammonium salts of high average molecular weight alkyl benzene sulfonates, inhibitor E was ethylene diamine dinonylnaphthalene sulfonate, and inhibitor F was a kerosene solution of dimerized linoleic acid containing small amounts of phosphorus, sulfur, and chlorine in unidentified form, and having a pH of about 2.

Comparison of the results in Table A demonstrates the difficult nature of the problem of imparting rust preventive properties to marine diesel fuels and the unique effectiveness of the agents of this invention.

In addition to imparting salt water corrosion inhibiting characteristics to marine diesel fuels, it has been found that the agents of this invention also impart improved lubricity to the fuels, even when used in minute amounts disclosed herein. This property has been demonstrated by subjecting medium diesel fuel compositions, made up of agents included by the invention and the base fuel used in the previous tests, to the so-called "4-ball test." Briefly, this test involves rotation at a preselected speed of a single steel ball in contact with three additional steel balls held immobile beneath the first ball in a clamp or cradle. The three immobile steel balls and the rotating single steel ball are forced into contact with each other under a preselected, vertically applied compression load. Sufficient test oil is poured into the test cup to cover the three lower balls to a fixed depth. The test is carried out by continuing the rotation of the single steel ball in contact with the three immobile steel balls for whatever period of time is satisfactory, usually one or two hours. During the test, the oil in the test cup is carried out at a predetermined temperature, the operable temperature range for the test apparatus normally being considered from about 86° F. to about 465° F. At the conclusion of the test, wear is measured by examination of the cleaned surfaces of the three stationary test balls under a microscope, the two maximum right angle diameters of each wear scar being measured to the closest 0.01 mm., recorded, and averaged. The results of the tests are presented below:

bricity imparted to the diesel oil by the agents of the invention. Lubricating characteristics are highly desirable in diesel fuels in order to lengthen the service life of the fuel injectors.

In addition to the foregoing tests the utility of the fuels of this invention has been demonstrated by bench tests adapted to test fuel injector life and which have been found to correlate substantially directly with actual operation. These tests are carried out by passage of diesel fuel through fuel injectors at a rate and temperature comparable to those of actual diesel engines. These tests indicate that fuel injector life can be extended up to several hundred percent, when using diesel fuels containing about 0.02 percent salt water, by incorporation in the fuels of the preferred neutral cocoamine salt of 3-methylbutyl, 2-ethylhexyl acid orthophosphate in the amount of 0.0028 weight percent.

If desired, the marine diesel fuel compositions of this invention can contain in addition to the agents disclosed oxidation inhibitors, other corrosion inhibitors, anti-foam agents, flash point control agents, ignition quality improvers, or combustion improvers and other additives adapted to improve one or more properties of the oil.

Numerous modifications of the invention may be resorted to without departing from the spirit or scope thereof. Accordingly, only such limitations should be imposed as are indicated in the appended claims.

We claim:

1. In the method of operating a marine diesel engine, wherein a medium diesel fuel containing a corrosion causing amount of sea water is injected by fuel injectors into the cylinders of the engine for compression ignition and combustion therein, the combination therewith of the improvement comprising injecting into said cylinders a diesel fuel comprising a major amount of a medium diesel fuel subject to salt water emulsification, and containing about 0.001 to about 0.1 percent by weight of the composition of a substantially neutral salt of a primary n-alkyl amine containing 8 to 18 carbon atoms per molecule and a dialkyl acid orthophosphate whose alkyl groups are selected from the class consisting of 3-methylbutyl, 2-ethylhexyl, Oxo amyl and Oxo octyl radicals, the amount of said salt being sufficient to impart salt water corrosion inhibiting properties to the fuel.

2. In the method of operating a marine diesel engine, wherein a medium diesel fuel containing a corrosion causing amount of sea water is injected by fuel injectors into the cylinders of the engine for compression ignition and combustion therein, the combination therewith of the improvement comprising injecting into said cylinders a diesel fuel comprising a major amount of a medium diesel fuel subject to salt water emulsification, and containing about 0.002 to about 0.05 percent by weight of the composition of the substantially neutral salt of n-dodecyl amine and 3-methylbutyl, 2-ethylhexyl acid orthophosphate, the amount of said salt being sufficient to impart salt water corrosion inhibiting properties to the fuel.

3. In the method of operating a marine diesel engine, wherein a medium diesel fuel containing a corrosion causing amount of sea water is injected by fuel injectors into the cylinders of the engine for compression ignition and combustion therein, the combination therewith of the improvement comprising injecting into said cylinders a diesel fuel comprising a major amount of a medium diesel fuel subject to salt water emulsification, and containing about 0.002 to about 0.05 percent by weight of the composition of the substantial neutral salts of cocoamine and 3-methylbutyl, 2-ethylhexyl acid orthophosphate, the amount of said salts being sufficient to impart salt water corrosion inhibiting properties to the fuel.

4. In the method of operating a diesel-powered ocean-going vessel, wherein a medium diesel fuel is stored in intimate contact with a relatively large volume of sea water prior to use, and wherein said medium diesel fuel, containing a corrosion causing amount of sea water as a result of such storage, is injected by fuel injectors into the cylinders of the engine for compression ignition and combustion therein, the combination therewith of the improvement comprising injecting into said cylinders a diesel fuel comprising a major amount of a medium diesel fuel and containing about 0.002 to about 0.05 percent by weight of the composition of the substantially neutral salts of cocoamine and 3-methylbutyl, 2-ethylhexyl acid orthophosphate, the amount of said salts being sufficient to impart salt water corrosion inhibiting properties to the fuel.

References Cited in the file of this patent

UNITED STATES PATENTS

| | | |
|---|---|---|
| 2,297,114 | Thompson | Sept. 29, 1942 |
| 2,340,331 | Knutson | Feb. 1, 1944 |
| 2,371,851 | Smith et al. | Mar. 20, 1945 |
| 2,385,158 | Paulsen | Sept. 18, 1945 |
| 2,503,401 | Mattano | Apr. 11, 1950 |
| 2,562,845 | Reamer | July 31, 1951 |
| 2,607,665 | Duncan | Aug. 19, 1952 |
| 2,664,400 | Woodstock et al. | Dec. 29, 1953 |
| 2,673,145 | Chandler | Mar. 23, 1954 |
| 2,728,643 | Vaughn | Dec. 27, 1955 |
| 2,728,728 | Vaughn | Dec. 27, 1955 |

FOREIGN PATENTS

| | | |
|---|---|---|
| 600,191 | Great Britain | Apr. 2, 1948 |